United States Patent
Shimbaru (10) Patent No.: US 7,983,481 B2
(45) Date of Patent: Jul. 19, 2011

(54) COLOR PROCESSING APPARATUS AND METHOD THEREOF

(75) Inventor: Susumu Shimbaru, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 658 days.

(21) Appl. No.: 12/101,597

(22) Filed: Apr. 11, 2008

(65) Prior Publication Data

US 2008/0279451 A1    Nov. 13, 2008

(30) Foreign Application Priority Data

Apr. 26, 2007 (JP) ................. 2007-117624

(51) Int. Cl.
*G06K 9/00* (2006.01)
(52) U.S. Cl. .................. 382/167; 382/162; 382/168
(58) Field of Classification Search .................. 382/162, 382/167, 169; 345/589, 590; 358/1.9, 2.1, 358/1.16, 515; 348/602, 655; 315/151; 356/407; 347/115, 900
See application file for complete search history.

(56) References Cited

U.S. PATENT DOCUMENTS 6,707,573 B1 * 3/2004 Ito et al. ................. 358/1.9
7,215,343 B2 * 5/2007 Edge ....................... 345/604

FOREIGN PATENT DOCUMENTS

| JP | 09-093451 | | 4/1997 |
| JP | 2003169222 | * | 6/2003 |
| WO | WO02/076086 | * | 9/2002 |

* cited by examiner

*Primary Examiner* — Anh Hong Do
(74) *Attorney, Agent, or Firm* — Cowan, Liebowitz & Latman, P.C.

(57) ABSTRACT

In order to match the color appearance of the display image on a monitor to that of a print image, the white point of the monitor and that of the viewing light upon viewing the print image are obtained, and a white point upon viewing the display image on the monitor and that upon viewing the print image are calculated using the white point of the monitor, that of the viewing light, and a reference white point. An input color is corrected using the calculated white points. At this time, as the reference white point, a white color which the human visual system perceives as white is used.

12 Claims, 7 Drawing Sheets

COLOR PROCESSING APPARATUS AND METHOD THEREOF

BACKGROUND OF THE INVENTION

1. Field of the Invention

The present invention relates to a color matching process.

2. Description of the Related Art

In color matching between devices of different types, generally, a color appearance model such as CIECAM02 which is recommended by the Commission Internationale de l'Eclairage (CIE) is used. A color appearance model predicts color appearances in viewing environments having different characteristics while considering chromatic adaptation.

The human visual system has a function to change its sensitivity so as to adapt to a new environment. For example, when a person moves from a room illuminated by a fluorescent lamp of a daylight color to a room illuminated by an incandescent lamp, he or she initially feels the illumination light as yellowish. After a while, however, he or she does not feel the yellowishness. This is because the visual sense adapts to the illumination light, that is, correction action of the visual system is occurred. This is called chromatic adaptation.

Adaptation of the visual system cannot completely cancel the change of illumination light. Even when the visual sense chromatically adapts to the illumination light sufficiently, it does not perceive the color of the illumination light as white. This is called incomplete adaptation.

Chromatic adaptation and incomplete adaptation also occur when viewing a monitor. For example, when viewing a monitor whose white point has a high color temperature, a person initially feels it as bluish, but less bluish after a while (chromatic adaptation). However, the bluishness cannot be completely canceled (incomplete adaptation).

CIECAM02 uses equal energy white (X=Y=Z=100) in a color prediction process to perform correction while considering incomplete adaptation. Theoretically, equal energy white is regarded to be perceived as white by a human. However, since the color temperature of equal energy white is about 5,460K, the human visual system perceives it as a considerably yellowish color. For this reason, incomplete adaptation cannot be accurately predicted.

When a display image on a monitor and an output image (printed material) from a printer are placed side by side and viewed, the visual system tries to adapt to both of the white color of the monitor and that of the viewing light obtained from the ambient light reflected from the printed material. Accordingly, by using an adaptation white point considering partial adaptation, the color matching accuracy can be improved.

In Japanese Patent Laid-Open No. 9-093451, a partial adaptation white color for a monitor is obtained from the monitor white color and illumination light white color. On the other hand, as an adaptation white color for a printer, a white color without considering partial adaptation is used. That is, the partial adaptation model in Japanese Patent Laid-Open No. 9-093451 considers the influence of the illumination light upon viewing the monitor, but does not consider that of the monitor upon viewing the printed material. As a result, color matching with a high accuracy cannot be implemented between a monitor and printer.

SUMMARY OF THE INVENTION

In one aspect, a color processing apparatus for matching a color appearance of a display image on a monitor to a color appearance of a print image, comprises: an obtaining section, arranged to obtain a white point of the monitor and a white point of a viewing light upon viewing the print image; a calculator, arrange to calculate a white point upon viewing the display image on the monitor and a white point upon viewing the print image using the white point of the monitor, the white point of the viewing light, and a reference white point; and a color corrector, arranged to correct an input color using the white points calculated by the calculator, wherein the reference white point indicates a white color which a human visual system perceives as white.

According to the aspect, upon viewing images in viewing environments with different viewing conditions that are placed side-by-side, color matching with a high accuracy can be performed.

Further features of the present invention will become apparent from the following description of exemplary embodiments with reference to the attached drawings.

DESCRIPTION OF THE EMBODIMENTS

Color processing of embodiments according to the present invention will be described in detail hereinafter with reference to the accompanying drawings.

First Embodiment

[Arrangement of Apparatus]

Figure 1:
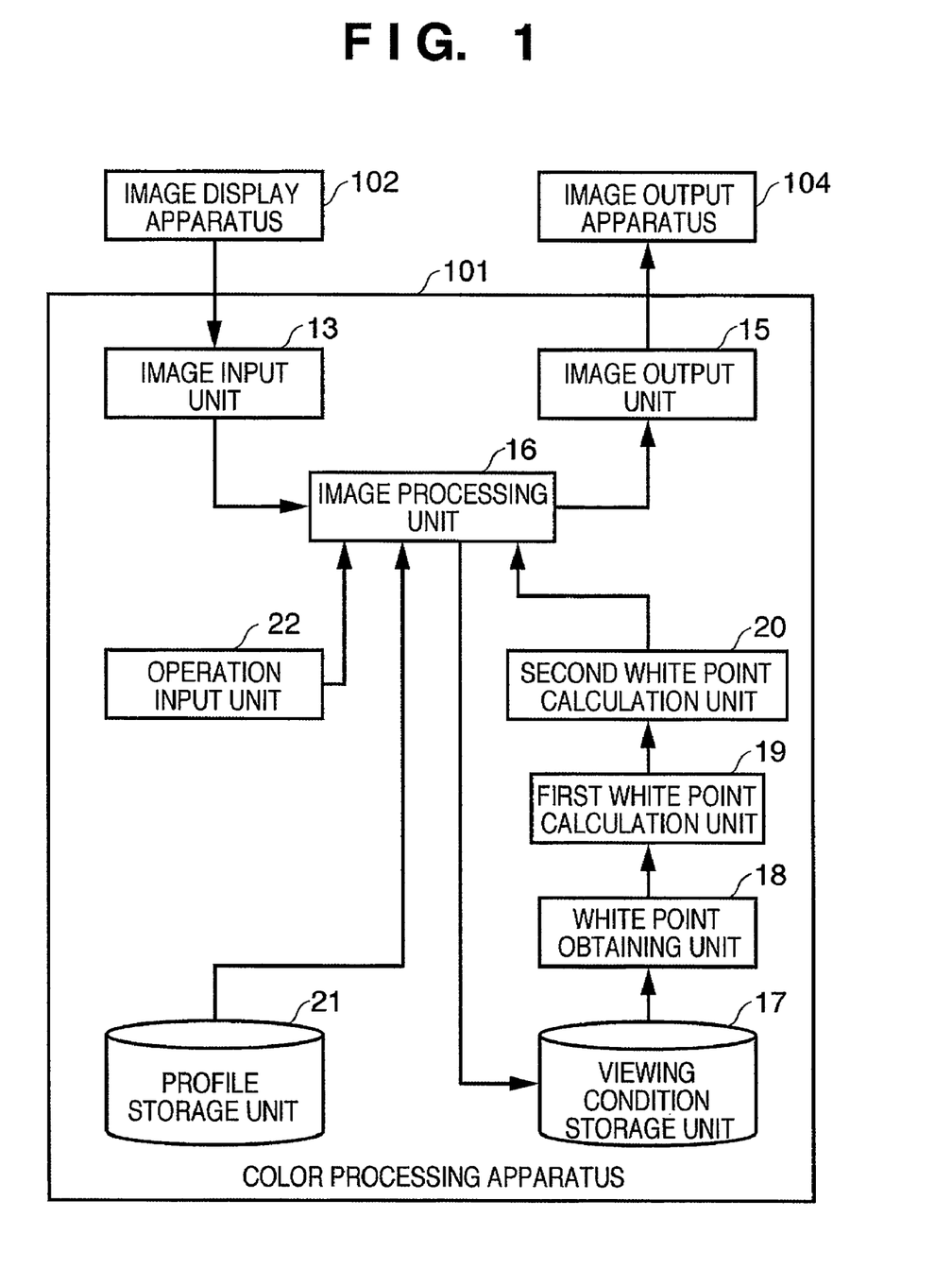
FIG. 1 is a block diagram showing the arrangement of a color processing apparatus of the first embodiment.

FIG. 1 is a block diagram showing the arrangement of a color processing apparatus 101 of the first embodiment.

The color processing apparatus 101 is connected to an image display apparatus 102 such as a monitor which displays an image and an image output apparatus 104 such as a printer which prints an image.

An image input unit 13 inputs image data of an image displayed on the image display apparatus 102. An image processing unit 16 performs image processing such as color processing to the image data input by the image input unit 13. An image output unit 15 outputs the image data which underwent the image processing by the image processing unit 16 to the image output apparatus 104.

A profile storage unit 21 stores the profiles of the image display apparatus 102 and image output apparatus 104. A viewing condition storage unit 17 stores viewing condition information which indicates the viewing condition of the image display apparatus 102, and viewing condition information which indicates the viewing condition of a printed material.

A white point obtaining unit 18 obtains white point information which indicates a white point from the viewing condition information stored in the viewing condition storage unit 17. A first white point calculation unit 19 calculates a white point for incomplete adaptation correction from the white point information obtained by the white point obtaining unit 18. A second white point calculation unit 20 calculates a white point for partial adaptation correction from the white point for incomplete adaptation correction calculated by the first white point calculation unit 19, or the like.

An operation input unit 22 comprises a pointing device such as a keyboard, mouse, touch panel, or the like, and inputs a user's instruction to the image processing unit 16.

[Image Processing]

Figure 2:
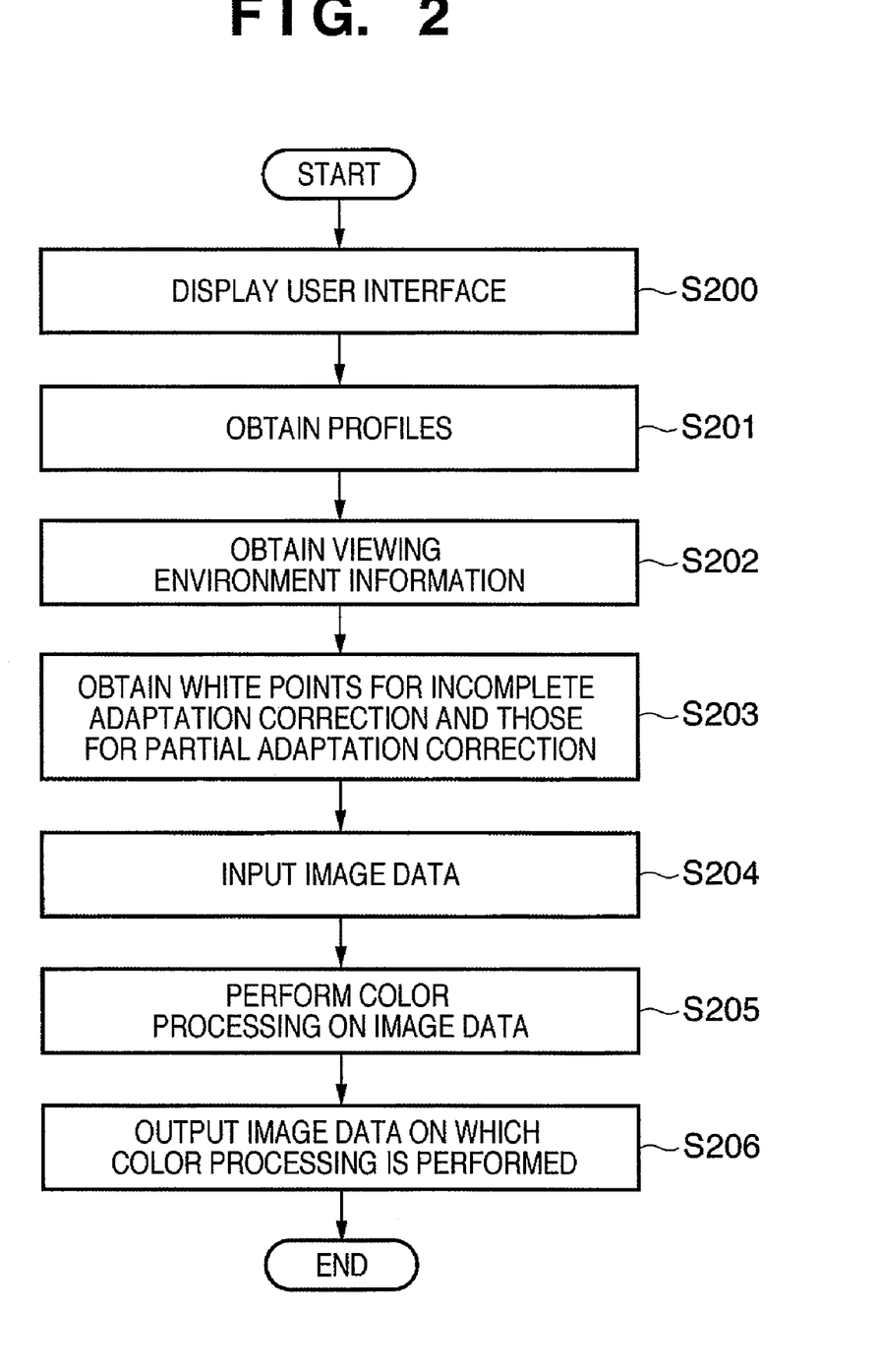
FIG. 2 is a flowchart illustrating the image processing in an image processing unit.

FIG. 2 is a flowchart for explaining the steps of image processing executed in the image processing unit 16.

The image processing unit 16 displays a user interface (UI) for setting various types of conditions for color matching on a monitor (S200). The monitor for displaying the UI can be the image display apparatus 102, or may be separately prepared.

Figure 3:
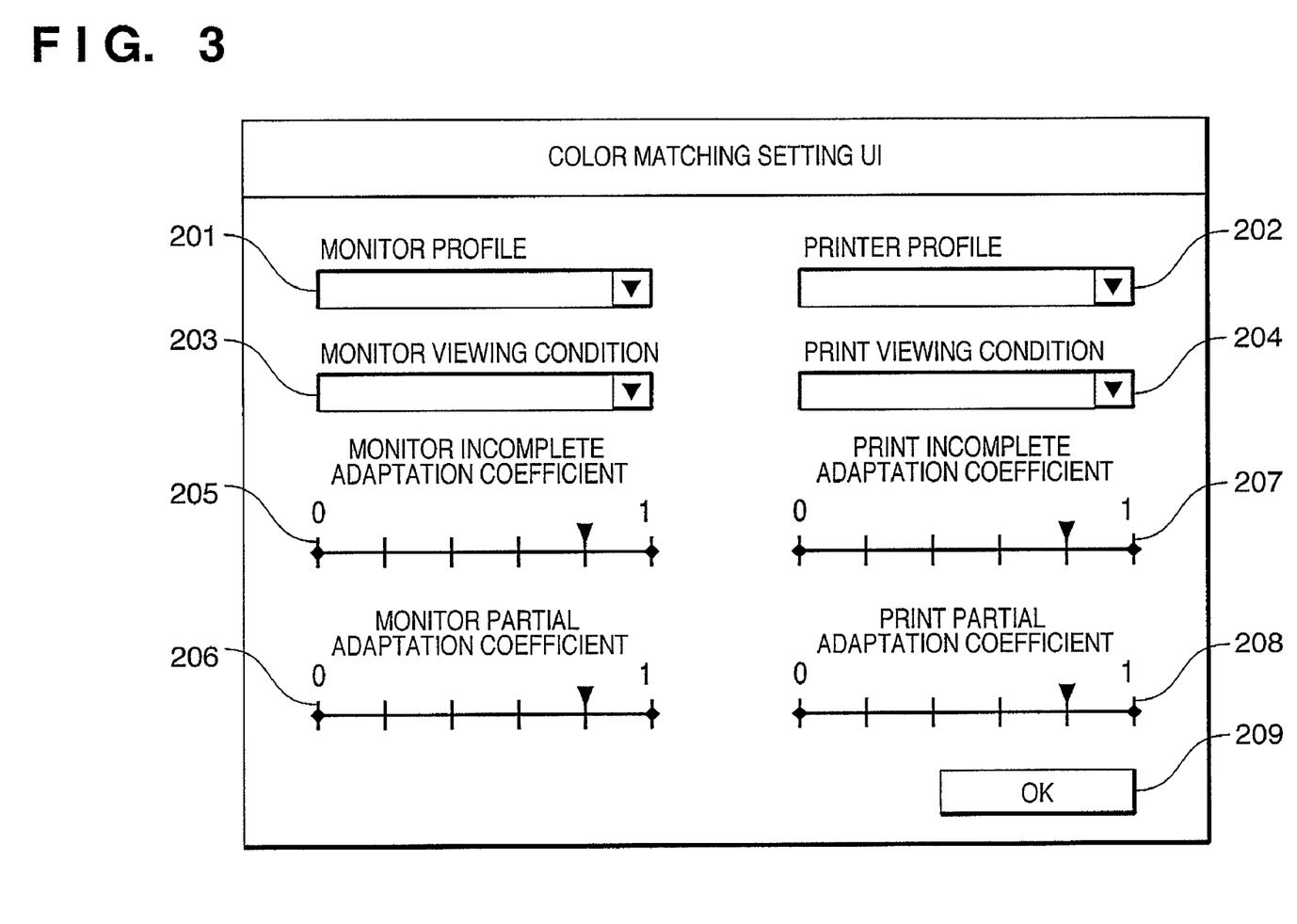
FIG. 3 is a view illustrating an example of a user interface for inputting user's instructions.

FIG. 3 is a view illustrating an example of the user interface for color matching setting. A user selects the profile of the image display apparatus 102 and that of the image output apparatus 104, which are subject to color matching, from the drop-down menu of a monitor profile setting section 201 and that of a printer profile setting section 202, respectively. The names or symbols of profiles stored in the profile storage unit 21 are listed in the drop-down menu.

The user also selects the viewing condition of the image display apparatus 102 and that of a printed material from the image output apparatus 104 from the drop-down menu of a monitor viewing condition setting section 203 and that of a print viewing condition setting section 204, respectively. The names or symbols of viewing condition information stored in the viewing condition storage unit 17 are listed in the drop-down menu.

Furthermore, the user operates sliders 205 to 208 to set incomplete adaptation coefficients and partial adaptation coefficients upon viewing the monitor and the printed material. When color matching setting using the UI is complete, the user presses an OK button 209.

When the OK button 209 is pressed, the image processing unit 16 reads the monitor profile and printer profile set in the monitor profile setting section 201 and printer profile setting section 202, respectively, from the profile storage unit 21 (S201). In addition, the image processing unit 16 reads the viewing condition information of the monitor and that of the printed material set in the monitor viewing condition setting section 203 and print viewing condition setting section 204, respectively, from the monitor condition storage unit 17 (S202).

The white point obtaining unit 18 obtains white point information from the viewing condition information read by the image processing unit 16. The first white point calculation unit 19 calculates a white point for incomplete adaptation correction from the white point information obtained by the white point obtaining unit 18 and the incomplete adaptation coefficients set by the sliders 205 and 207. The white point calculation unit 20 calculates a white point for partial adaptation correction from the white point for incomplete adaptation correction, the partial adaptation coefficients set by the sliders 206 and 208, and the like. As the result, the image processing unit 16 obtains the white point for incomplete adaptation correction and that for partial adaptation correction corresponding to the viewing condition of the monitor and that of the printed material, which are designated by the user (S203).

The image processing unit 16 inputs the image data of an image displayed on the image display apparatus 102 through the image input unit 13 (S204). The image processing unit 16 then performs color processing on the image data using the calorimetric value data of the monitor profile, that of the printer profile, the viewing condition information of the monitor, and that of the printed material, which are designated by the user, as well as the white points for adaptation correction (S205). The image processing unit 16 then outputs the image data, on which the color processing is performed, to the image output apparatus 104 through the image output unit 15 (S206).

[Calculation of White Point]

Figure 4:
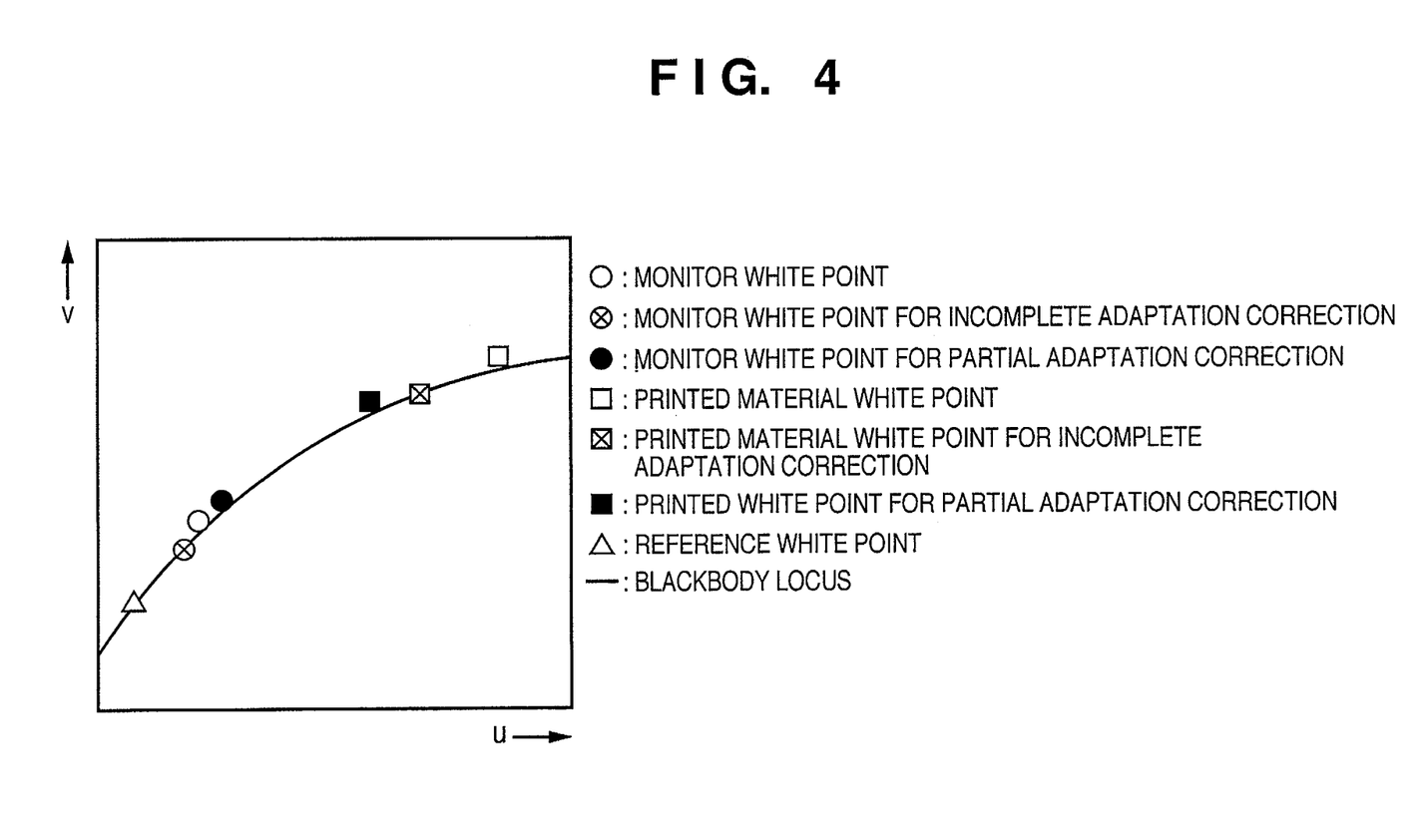
FIG. 4 is a view schematically showing the relationship among white points in this embodiment.

FIG. 4 is a view schematically showing the relationship among the white points in this embodiment.

As described above, the human visual system cannot completely correct the color of a light source upon viewing a monitor, and that of a light source upon viewing a printed material as well. Accordingly, it is necessary to correct incomplete adaptation. In order to accurately correct incomplete adaptation, a white color (indicated by Δ in FIG. 4) which the human visual system senses as whitest should be used as a reference white. In the first embodiment, a point on a blackbody locus with a color temperature of 8,500K is used as the reference white. This is based on the result of a test in which a white color is displayed on the monitor and its color temperature is changed to obtain the white color which a subject feels most preferable. Of course, the reference white is not limited to this, and a different white point, e.g., a white point on a daylight locus, which has a color temperature higher than equal energy white, may be set.

The white point obtaining unit 18 calculates chromaticities $u_{Wm}$ and $v_{Wm}$ of the white point (to be referred to as the monitor white point, hereinafter) of the monitor and chromaticities $u_{Wp}$ and $v_{Wp}$ of the white point (to be referred to as the printed material white point) of the viewing light obtained from the ambient light reflected by the printed material, by $$u_{Wi} = 4 \cdot X_{Wi}/(X_{Wi}+15 \cdot Y_{Wi}+3 \cdot Z_{Wi})$$

$$v_{Wi} = 6 \cdot Y_{Wi}/(X_{Wi}+15 \cdot Y_{Wi}+3 \cdot Z_{Wi}) \quad (1)$$

where i=m, p $X_{Wm}$, $Y_{Wm}$, and $Z_{Wm}$ represent the tristimulus values of the monitor white point, and $X_{Wp}$, $Y_{Wp}$, and $Z_{Wp}$ represent the tristimulus values of the printed material white point.

The white point obtaining unit 18 then obtains a color temperature $T_{Wm}$ of the monitor white point, which corresponds to the chromaticities of the monitor white point, and a color temperature $T_{Wp}$ of the printed material white point, which corresponds to the chromaticities of the printed material white point, from, e.g., a chromaticity-color temperature table stored in the viewing condition storage unit 17.

The first white point calculation unit 19 calculates a color temperature $T'_{Wm}$ of the monitor white point for incomplete adaptation correction and a color temperature $T'_{Wp}$ of the printed material white point for incomplete adaptation correction by equation (2). Note that a color temperature $T_{Wr}$ of the reference white point is 8,500K as described above.

$$1/T'_{Wm} = \{k_{inc\_m} \cdot 1/T_{Wm}\} + \{(1-k_{inc\_m}) \cdot 1/T_{Wr}\}$$

$$1/T'_{Wp} = \{k_{inc\_p} \cdot 1/T_{Wp}\} + \{(1-k_{inc\_p}) \cdot 1/T_{Wr}\} \quad (2)$$

where $k_{inc\_i}$ is an incomplete adaptation coefficient, and $$0 \leq k_{inc\_i} \leq 1$$

Note that the value set by the user in the color matching setting UI described above is utilized as the incomplete adaptation coefficient, but it can be automatically delivered using a function or the like. The reciprocal of the color temperature is used for the calculation described above for the following reason. That is, the difference in color temperature does not correspond to the color difference perceived by humans, but the reciprocal of the color temperature substantially corresponds to the human perception.

By using the white points of the color temperatures obtained by equation (2), it is possible to accurately correct incomplete adaptation and accurately predict color appearances upon separately viewing the monitor and printed material. Note that, when viewing the monitor and printed material at the same time, the adaptation state is different from that when viewing them separately. In this case, it is considered that the printed material white point affects color appearance when viewing the monitor, and the monitor white point affects color appearance when viewing the printed material.

To solve this problem, the second white point calculation unit 20 calculates a color temperature $T''_{Wm}$ of the monitor white point for partial adaptation correction and a color temperature $T''_{Wp}$ of the printed material white point for partial adaptation correction while considering partial adaptation, by:

$$1/T''_{Wm} = (Km \cdot L^*_m \cdot 1/T'_{Wm} - Km' \cdot L^*_p \cdot 1/T'_{Wp})/(Km \cdot L^*_m + Km' \cdot L^*p)$$

$$1/T''_{Wp} = (Kp \cdot L^*_p \cdot 1/T'_{Wp} - Kp' \cdot L^*m \cdot 1/T'_{Wm})/(Kp \cdot L^*_p + Kp' \cdot L^*_m) \quad (3)$$

where $Ki = k_{mix\_i}$ is a partial adaptation coefficient, $$Ki' = 1 - Ki$$

$$0 \leq Ki \leq 1$$

$L^*_i$ is a weighting coefficient based on the luminance of the white point.

Note that the value set by the user in the color matching setting UI described above is utilized as the partial adaptation coefficient, but it can be automatically delivered using a function or the like. Based on the idea that the human visual system adapts to the white point with a higher luminance, the weighting coefficient $L^*_i$ is delivered by:

$$\text{if } Y_{Wm} \leq Y_{Wp}, \text{ then } L^*_m = 116.0 \times (Y_{Wm}/Y_{Wp})^{1/3} - 16.0$$
$$\text{else } L^*_m = 100$$

$$\text{if } Y_{Wp} \leq Y_{Wm}, \text{ then } L^*_m = 116.0 \times (Y_{Wp}/Y_{Wm})^{1/3} - 16.0$$
$$\text{else } L^*_m = 100 \quad (4)$$

The second white point calculation unit 20 calculates chromaticities $u''_{Wm}$ and $v''_{Wm}$ corresponding to the color temperature of the monitor white point for partial adaptation correction and chromaticities $u''_{Wp}$ and $v''_{Wp}$ corresponding to the color temperature of the printed material white point for partial adaptation correction, by using the chromaticity-color temperature table described above. The second white point calculation unit 20 then calculates tristimulus values $X''_{Wm}Y''_{Wm}Z''_{Wm}$ of the monitor white point for partial adaptation correction by:

$$\text{if } Y_{Wm} \leq Y_{Wp}, \text{ then } Y''_{Wm} = \{(L^*''_{Wm} + 16.0)/116.0\}^3 \cdot Y_{Wp}$$

$$\text{else } Y''_{Wm} = Y_{Wm}$$

$$X''_{Wm} = (3.0/2.0) \cdot (u''_{Wm}/v''_{Wm}) \cdot Y''_{Wm}$$

$$Z''_{Wm} = (4.0 \cdot X''_{Wm}/u''_{Wm} - X''_{Wm} - 15.0 \cdot Y''_{Wm})/3.0 \quad (5)$$

where $L^*''_{Wm} = L^*_m \cdot k_m + 100.0(1 - k_m)$

The second white point calculation unit 20 also calculates a tristimulus value $X''_{Wp}Y''_{Wp}Z''_{Wp}$ of the printed material white point for partial adaptation correction by:

$$\text{if } Y_{Wp} \leq Y_{Wm}, \text{ then } Y''_{Wp} = \{(L^*''_{Wp} + 16.0)/116.0\}^3 \cdot Y_{Wm}$$

$$\text{else } Y''_{Wp} = Y_{Wp}$$

$$X''_{Wp} = (3.0/2.0) \cdot (u''_{Wp}/v''_{Wp}) \cdot Y''_{Wp}$$

$$Z''_{Wp} = (4.0 \cdot X''_{Wp}/u''_{Wp} - X''_{Wp} - 15.0 \cdot Y''_{Wp})/3.0 \quad (6)$$

where $L^*''_{Wp} = L^*_p \cdot k_p + 100.0(1 - k_p)$

[Color Processing]

Figure 5:
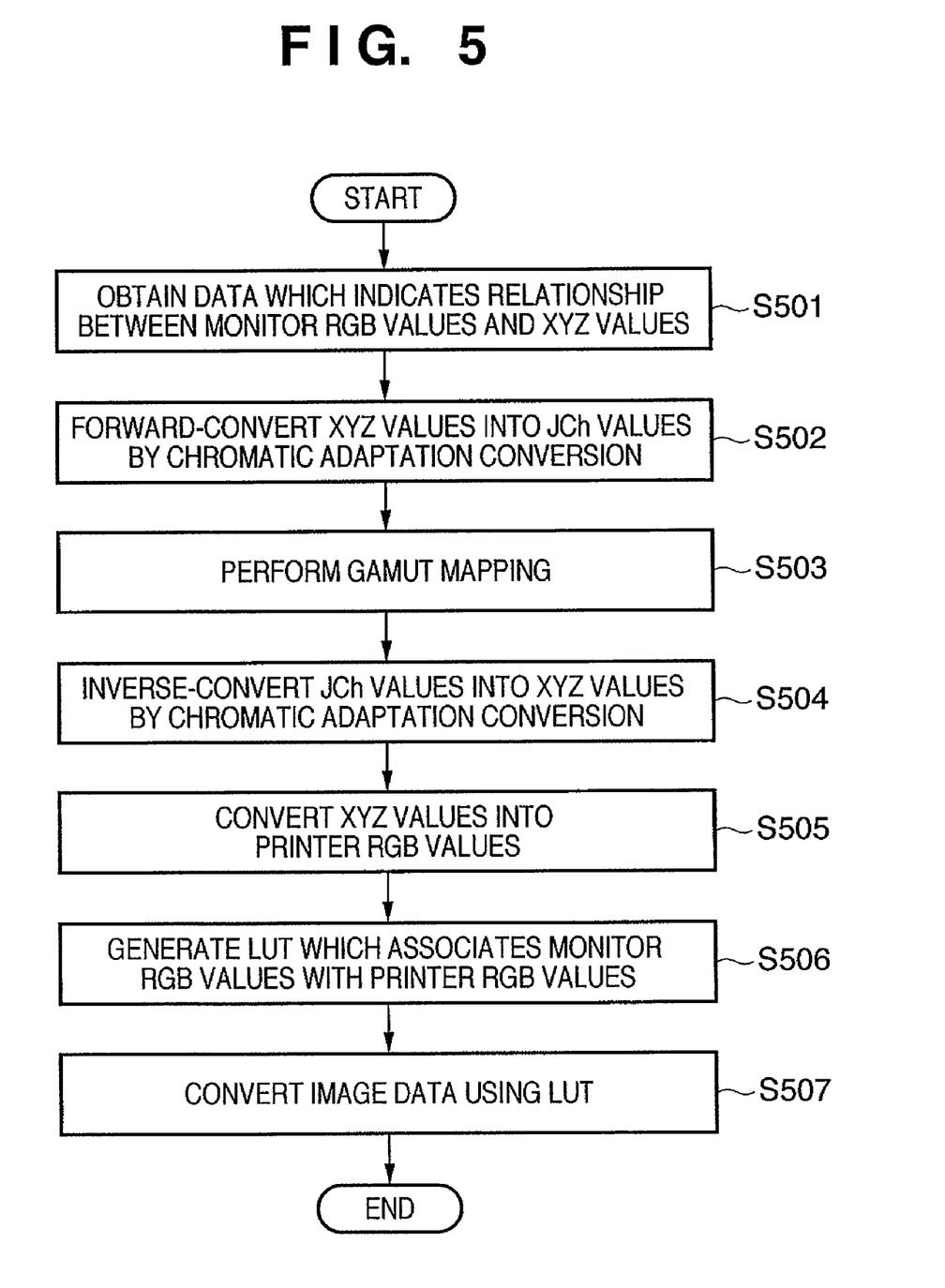
FIG. 5 is a flowchart for explaining the color processing.

FIG. 5 is a flowchart for explaining the color processing (S205).

The image processing unit 16 obtains the data described in the monitor profile, which indicates the relationship between the device RGB values and XYZ values of a grid point (S501). The image processing unit 16 then converts the XYZ values of each grid point into JCh values by using CIECAM02 forward conversion based on the monitor white point for partial adaptation correction (S502). Note that CIECAM02 is used for chromatic adaptation conversion, but the chromatic adaptation conversion is not limited to this. Another conversion formula such as the Von Kries chromatic adaptation formula or the like may be used.

The color processing unit 16 performs calorimetric gamut mapping of the JCh values of each grid point (S503). Since the shape of a monitor gamut is different from that of a printer gamut, the gamut mapping maps a color outside the printer gamut onto the printer gamut. Generally, when it is desired to maintain the color appearance as much as possible, such as in color matching between the monitor and printer, colorimetric gamut mapping is desirable. Colorimetric gamut mapping is a technique in which, for example, a color within the printer gamut is not mapped, but a color outside the printer gamut is mapped to the point closest to the boundary of the printer gamut. Gamut mapping is not limited to colorimetric one, and another method may be used.

The color processing unit 16 converts the mapped JCh values into XYZ values by using CIECAM02 inverse conversion based on the printed material white point for partial adaptation correction (S504). The color processing unit 16 then converts the XYZ values into the device RGB values of the image output apparatus 104 by using the printer profile (S505).

The color processing unit 16 generates a lookup table (LUT) as color processing data for associating the monitor device RGB values of each grid point with the corresponding device RGB values of the image output apparatus 104 (S506). The color processing unit 16 converts the RGB values of the image data input in step S204 into the device RGB value of the image output apparatus 104 by using the generated LUT and an interpolation operation such as tetrahedron interpolation, thereby generating the image data to be supplied to the image output apparatus 104 (S507).

In this manner, incomplete adaptation is accurately corrected, and a human-adaptable white point is also accurately obtained while considering the mutual influence of the monitor and viewing light upon viewing both the display image on the monitor and the printed material. Therefore, it is possible to color-match the color appearance of the display image on the monitor to that of the printed material with a high accuracy.

Second Embodiment

Color Processing of the Second Embodiment according to the present invention will be described below. Note that the same components as in the first embodiment will be designated by the same reference numerals in the second embodiment, and a detailed description will not be repeated.

Figure 6:
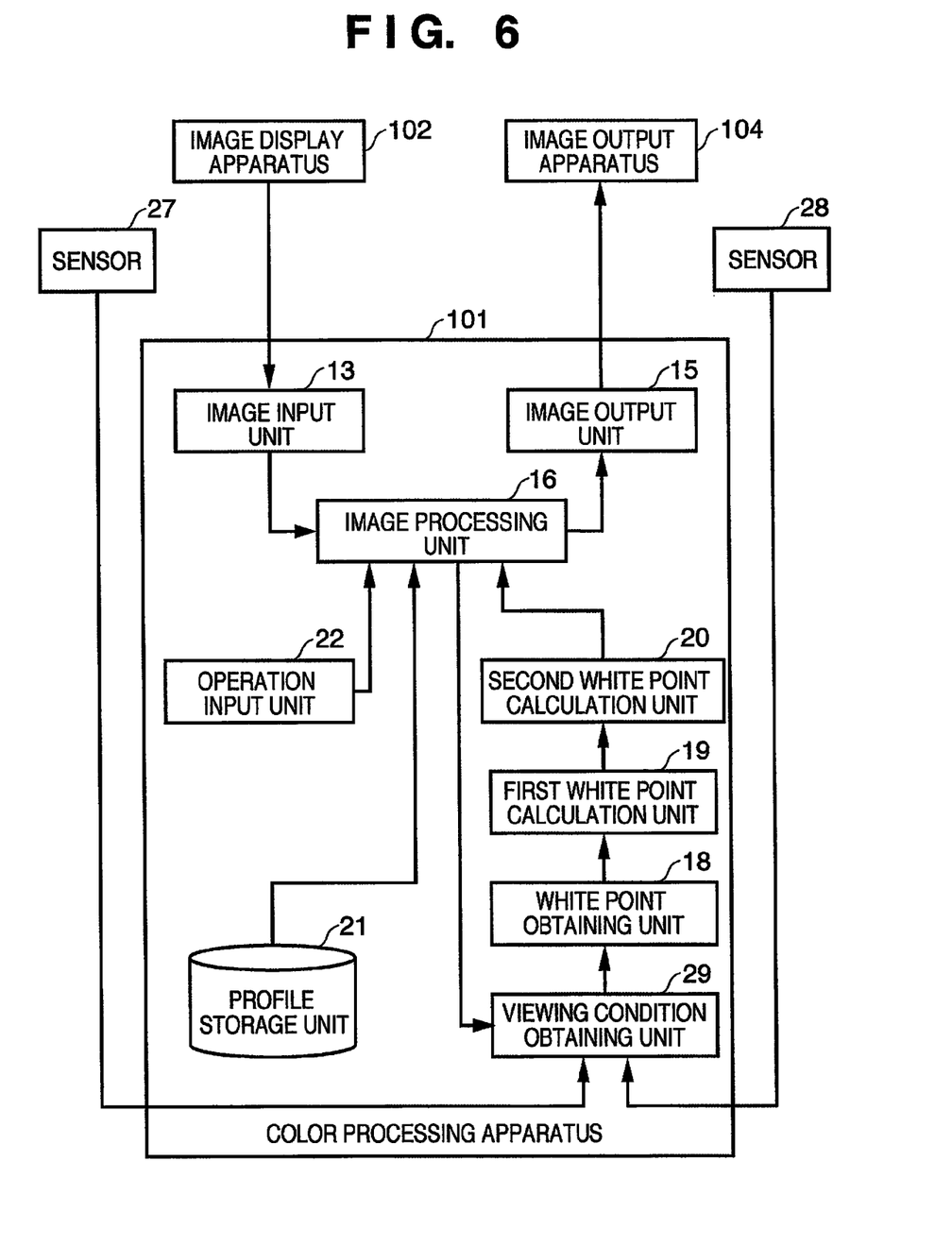
FIG. 6 is a block diagram showing the arrangement of a color processing apparatus of the second embodiment.

FIG. 6 is a block diagram showing the arrangement of a color processing apparatus 101 of the second embodiment.

The color processing apparatus 101 of the second embodiment comprises sensors 27 and 28 and a viewing condition obtaining unit 29, in place of the viewing condition storage unit 17 of the first embodiment shown in FIG. 1.

The sensor 27 measures the monitor light of an image display apparatus 102. The sensor 28 measures the light of the environment in which a printed material from an image output apparatus 104 is viewed. The sensors 27 and 28 measure the tristimulus values of the white point of the monitor light and those of the white point of the ambient light, respectively, by using, e.g., a spectral radiancemeter. Note that it is also possible to provide one sensor and moves it depending on the light to be measured. The viewing condition obtaining unit 29 obtains the information of ambient light measured by the sensors 27 and 28, under control of an image processing unit 16.

Figure 7:
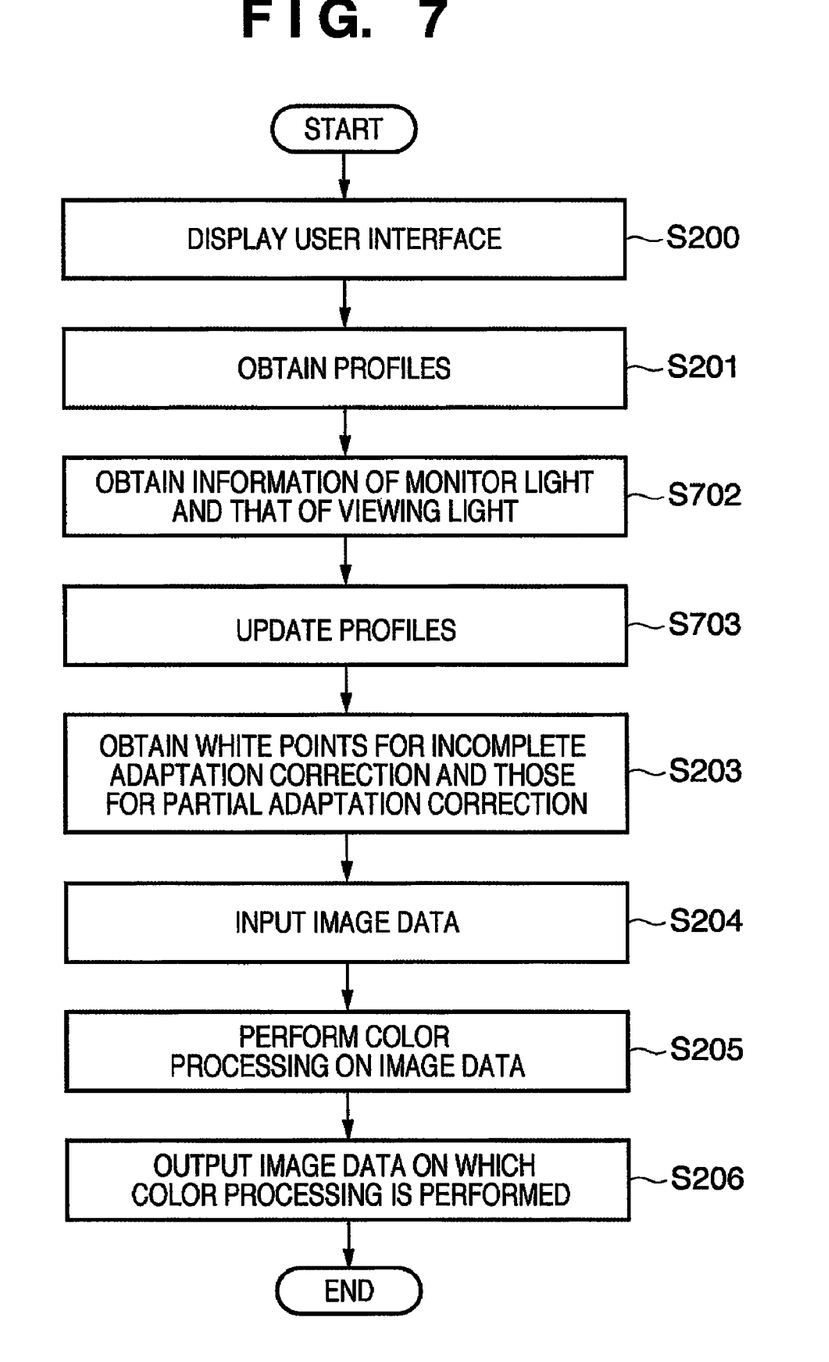
FIG. 7 is a flowchart for explaining the image processing in an image processing unit.

FIG. 7 is a flowchart illustrating the image processing in the image processing unit 16.

The image processing unit 16 displays a UI (S200), obtains profiles (S201), and then controls the viewing condition obtaining unit 29 to obtain the tristimulus values of the monitor light and ambient light (S702). The image processing unit 16 updates the profiles by the obtained tristimulus values of the monitor light and ambient light (S703).

After that, as in the first embodiment, the image processing unit 16 obtains white points for incomplete adaptation correction and those for partial adaptation correction (S203), inputs image data (S204), performs color processing (S205), and outputs the image data which underwent the color processing (S206).

According to this arrangement, the same effect as in the first embodiment can be obtained. In addition, it is possible to accurately find the white point of the monitor light and that of the ambient light, thereby performing color matching with a higher accuracy.

Modification of Embodiments

A case in which a display image on a monitor and an output image (printed material) from a printer are placed side by side and viewed has been described above. However, with reference to the above description, those skilled in the art can readily apply the above-described embodiments to another viewing situation.

An example of another viewing situation is a case in which monitors with different characteristics are placed side by side and the display images on the respective monitors are viewed. In this case, differences in display characteristics of the monitors, ambient light, viewing position of the observer, and the like serve as the different viewing conditions.

Document sheets or printed materials may be placed side by side in the different viewing environments, and a document sheet and printed material or two printed materials may be viewed. When viewing the two printed materials, an identical printer or printers of different types can be used. When the types of printers are different, the device profiles of the respective printers are used to perform color matching, as in proofing.

In addition, a document image may be photographed by a digital camera or read by a scanner, and the document image (display image) displayed on a monitor and the document sheet may be placed side by side and viewed. In this case, the device profile of the scanner and that of the monitor are used to perform color matching.

Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-117624, filed Apr. 26, 2007, which is hereby incorporated by reference herein in its entirety.

What is claimed is:

1. A color processing apparatus for matching a color appearance of a display image on a monitor to a color appearance of a print image, comprising:
   an obtaining section, arranged to obtain a white point of the monitor and a white point of a viewing light upon viewing the print image;
   a calculator, arrange to calculate a white point upon viewing the display image on the monitor and a white point upon viewing the print image using the white point of the monitor, the white point of the viewing light, and a reference white point; and
   a color corrector, arranged to correct an input color using the white points calculated by said calculator,
   wherein the reference white point indicates a white color which a human visual system perceives as white.

2. The apparatus according to claim 1, wherein the reference white point is a point on a blackbody locus.

3. The apparatus according to claim 1, wherein said calculator uses for the calculation a weight corresponding to a lightness of the white point of the monitor and a lightness of the white point of the viewing light.

4. The apparatus according to claim 1, wherein said obtaining section further obtains a monitor incomplete adaptation coefficient, a monitor partial adaptation coefficient, a print incomplete adaptation coefficient, and a print partial adaptation coefficient, and said calculator calculates the white point upon viewing the display image on the monitor by using the white point of the monitor, the white point of the viewing light, the reference white point, the monitor incomplete adaptation coefficient, and the monitor partial adaptation coefficient, and calculates the white point upon viewing the print image by using the white point of the monitor, the white point of the viewing light, the reference white point, the print incomplete adaptation coefficient, and the print partial adaptation coefficient.

5. A color processing method of matching a color appearance of a display image on a monitor to a color appearance of a print image, comprising:

using a processor to perform the steps of:

obtaining a white point of the monitor and a white point of a viewing light upon viewing the print image;

calculating a white point upon viewing the display image on the monitor and a white point upon viewing the print image using the white point of the monitor, the white point of the viewing light, and a reference white point; and correcting an input color using the white points calculated by said calculator, wherein the reference white point indicates a white color which a human visual system perceives as white.

6. The method according to claim 5, wherein the reference white point is a point on a blackbody locus.

7. The method according to claim 5, wherein the calculating step uses for the calculation a weight corresponding to a lightness of the white point of the monitor and a lightness of the white point of the viewing light.

8. The method according to claim 5, wherein the obtaining step further obtains a monitor incomplete adaptation coefficient, a monitor partial adaptation coefficient, a print incomplete adaptation coefficient, and a print partial adaptation coefficient, and the calculating step calculates the white point upon viewing the display image on the monitor by using the white point of the monitor, the white point of the viewing light, the reference white point, the monitor incomplete adaptation coefficient, and the monitor partial adaptation coefficient, and calculates the white point upon viewing the print image by using the white point of the monitor, the white point of the viewing light, the reference white point, the print incomplete adaptation coefficient, and the print partial adaptation coefficient.

9. A non-transitory computer-readable medium storing a computer-executable program causing a computer to perform a color processing method, the method comprising the step of:

obtaining a white point of the monitor and a white point of a viewing light upon viewing the print image;

calculating a white point upon viewing the display image on the monitor and a white point upon viewing the print image using the white point of the monitor, the white point of the viewing light, and a reference white point; and correcting an input color using the white points calculated by said calculator, wherein the reference white point indicates a white color which a human visual system perceives as white.

10. The medium according to claim 9, wherein the reference white point is a point on a blackbody locus.

11. The medium according to claim 9, wherein the calculating step uses for the calculation a weight corresponding to a lightness of the white point of the monitor and a lightness of the white point of the viewing light.

12. The medium according to claim 9, wherein the obtaining step further obtains a monitor incomplete adaptation coefficient, a monitor partial adaptation coefficient, a print incomplete adaptation coefficient, and a print partial adaptation coefficient, and the calculating step calculates the white point upon viewing the display image on the monitor by using the white point of the monitor, the white point of the viewing light, the reference white point, the monitor incomplete adaptation coefficient, and the monitor partial adaptation coefficient, and calculates the white point upon viewing the print image by using the white point of the monitor, the white point of the viewing light, the reference white point, the print incomplete adaptation coefficient, and the print partial adaptation coefficient.

\* \* \* \* \*